United States Patent [19]

Genuit

[11] 4,298,924
[45] Nov. 3, 1981

[54] SWITCHING REGULATOR CIRCUIT WITH PHASE SHIFT SUBTRACTION

[75] Inventor: Luther L. Genuit, Scottsdale, Ariz.

[73] Assignee: Honeywell Information Systems Inc., Phoenix, Ariz.

[21] Appl. No.: 80,642

[22] Filed: Oct. 1, 1979

[51] Int. Cl.³ .......................................... H02P 13/18
[52] U.S. Cl. .................................... 363/46; 323/290; 363/28; 363/48
[58] Field of Search ............... 323/17, DIG. 1, 287, 323/290; 363/17, 19, 21, 23, 25, 26, 28, 46, 48, 85–88; 336/130, 175

[56] References Cited

U.S. PATENT DOCUMENTS

| 2,531,820 | 11/1950 | Lindenblad | 336/175 |
| 3,454,862 | 7/1969 | Kurimura et al. | 363/88 |
| 3,573,597 | 5/1971 | Genuit | 363/28 |
| 4,013,939 | 3/1977 | Biess et al. | 323/DIG. 1 |
| 4,142,231 | 2/1979 | Wilson | 363/141 |

FOREIGN PATENT DOCUMENTS

| 1034206 | 6/1966 | United Kingdom | 363/46 |
| 1200435 | 7/1970 | United Kingdom | 363/48 |
| 444173 | 4/1975 | U.S.S.R. | 323/DIG. 1 |
| 638937 | 12/1978 | U.S.S.R. | 363/46 |

OTHER PUBLICATIONS

Solid/State/Design, "Considerations in the Design of Switching Type Regulators", pp. 30–34, Apr. 1963.

*Primary Examiner*—William H. Beha, Jr.
*Attorney, Agent, or Firm*—William W. Holloway, Jr.; L. J. Marhoefer; N. Prasinos

[57] ABSTRACT

A switching regulator circuit for utilization with power supplies supplying a high DC output current including a plurality of control rectifiers and inductive reactors with sequential gating of the rectifiers at regular intervals for providing overlapped output current pulses from the reactors. An output circuit receives the rippled current comprised of the overlapped output current pulses for reducing the ripple therein. The output circuit includes a choke in series with the output which induces phase shift between the rippled current and the output current. A sensing winding associated with the choke eliminates the phase shift voltage for forming a feedback signal as an input to a control circuit. The control circuit utilizes the feedback signal to control the rate at which the rectifiers are gated sequentially.

2 Claims, 6 Drawing Figures

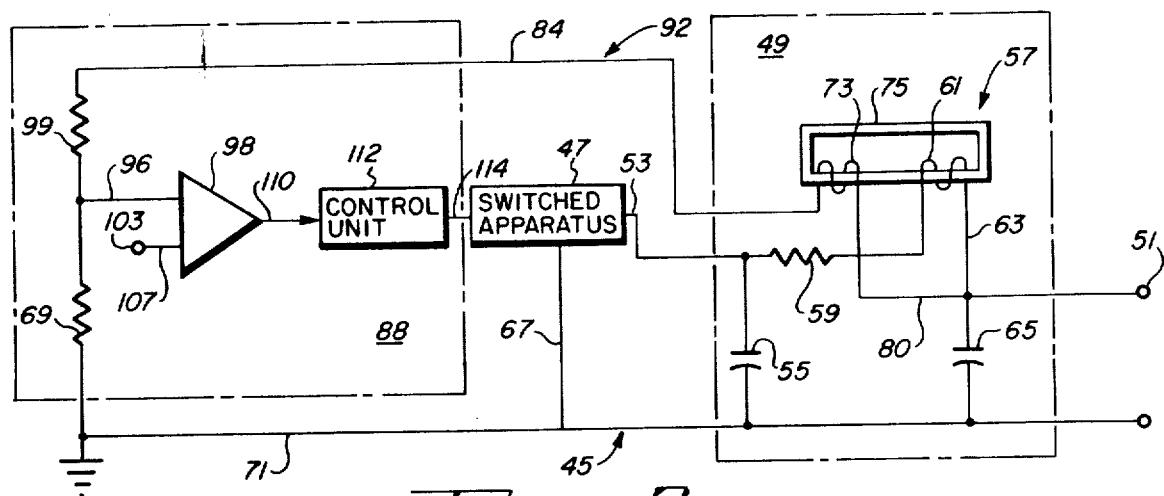
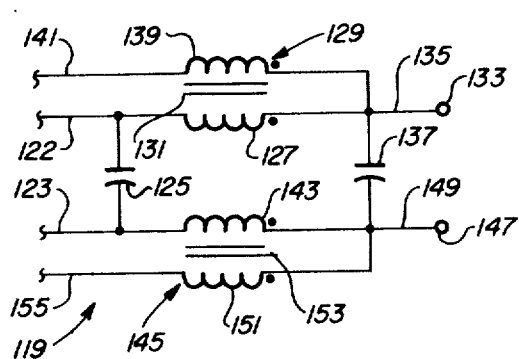
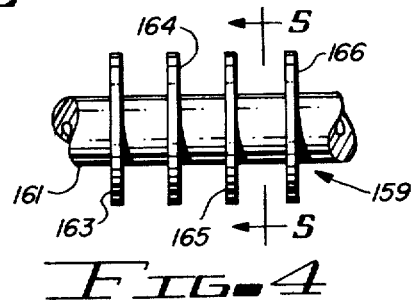
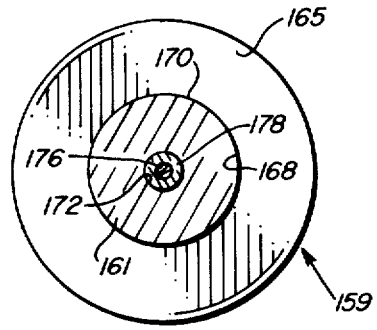
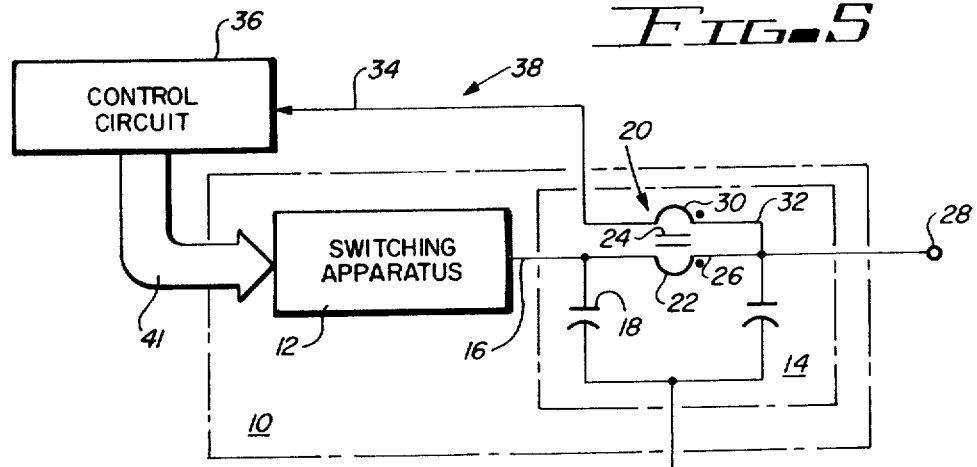

SWITCHING REGULATOR CIRCUIT WITH PHASE SHIFT SUBTRACTION

BACKGROUND OF THE INVENTION

1. Field of the Invention

The present invention relates generally to switching regulator power supplies for producing regulated DC power at low voltages and high amperages, and, more particularly, the present invention relates to switching regulator power supplies which are regulated by a control circuit receiving a feedback voltage from the output.

2. Description of the Prior Art

Switching regulator power supplies for producing electric power at regulated DC voltages and high amperages are well known in the art. An example of such a power supply is described in U.S. Pat. No. 3,573,597 issued to Genuit et al on Apr. 6, 1971 and entitled "High Current Switching Regulator with Overlapping Output Current Pulses". Genuit shows and describes a switching regulator circuit which is adapted for operation from an unregulated high voltage DC source. The circuit of Genuit utilizes a plurality of silicon control rectifiers (SCR) and inductive reactors with sequential gating of the rectifiers at regulator intervals for supplying overlapping output current pulses from the reactors to generate high output currents at low voltages with relatively low ripple currents. A standard $\pi$ filtering network is shown in Genuit which comprises a choke and two filter capacitors. The capacitors are connected at one end to the negative output of the switched apparatus of the switching regulator circuit. The filter capacitors have their other opposite ends connected to the input and output, respectively, of the choke. The choke is connected in series with the positive output of the switched apparatus.

U.S. Pat. No. 4,142,231 issued to Wilson et al on Feb. 27, 1979 and entitled "High Current Low Voltage Liquid Cooled Switching Regulator DC Power Supply", shows and describes a cooling system for a switching regulator circuit. The output of the switching regulator circuit is applied to two plates, one plate being positive, the other opposite plate being negative. The positive and negative plates are liquid cooled to provide the proper operating temperatures for the components.

Both the Wilson and Genuit patents show a control circuit which applies the necessary pulses to the gates of the silicon controlled rectifiers (hereinafter referred to as SCR) to render the SCR conductive. The control circuit as shown in Genuit is connected to the output of the switching regulator circuit for receiving a feedback voltage therefrom. The control circuitry varies the timing of the pulses to the various gates of the SCRs in order to maintain the voltage at the output at the desired level. The prior constructions of switching regulator circuits and more specifically the control units therefor do not utilize a feedback voltage which has the phase shift which is induced in the output by the choke, eliminated therefrom. It has been found to be desirable to eliminate the phase shift induced in the output voltage by the choke from the feedback circuit to the control circuit to provide for greater stability in the output at lower currents.

SUMMARY OF THE INVENTION

In accordance with the claimed invention a switching regulator circuit is provided with increased stability characteristics by eliminating the phase shift induced into the output by the chokes. The switching regulator circuit utilizes a plurality of SCRs and a plurality of reactors in a switched apparatus (or device) which provides for sequential overlapping operation of the output diodes and reactors. A control circuit is provided for firing the SCRs singly and individually at intervals for applying current pulses from an input power supply through each of the reactors separately. The overlapping of the current pulses has the effect of reducing the ripple currents in the output circuit.

The control circuit provides a plurality of control signals, each control signal is associated with a particular corresponding SCR. The control signals to each SCR are capable of being controlled individually so that each corresponding SCR can have the control signal applied to its gate and become conductive as desired. Since the control signals from the control circuit determine when the SCRs become conductive, the control circuit determines the DC voltage present at the output of the switching regulator circuit, which should be at some predetermined voltage. Typically the output circuits of switching regulator circuits have at least one choke and two filter capacitors. One filter capacitor is attached to each end of the choke and has the other opposite end thereof connected to the other output line of the switching regulator circuit. For example, if the choke is located in series with the positive output of the switching regulator circuit the filter capacitors will have their other opposite ends connected to the negative (or ground) output of the switching regulator circuit. Other arrangements of output circuits are of course possible such as having a filter choke disposed in series with both the positive and the negative outputs of the switching regulator circuit. One filter capacitor would be connected to the negative and positive outputs of the switching regulator circuit, which of course would means that it is connected to one end of both the chokes. The other filter capacitor would be connected to the other opposite end of the chokes away from the ends to which the other filter capacitor is connected.

In these types of output circuits the choke induces phase shift into the output. In prior constructions the output signal is fed directly to a control circuit for utilization in maintaining a predetermined DC voltage at the output. Generally this meant a trade off between reaction time in regulating the output location by the control circuit and stability of the output. If the control circuit was capable of reacting too quickly to changes in the output voltage oscillations were possible. These oscillations are particularly apparent at low output, current levels. The control circuit could be adapted to react to changes in the output slowly thereby decreasing the oscillations and possible instabilities. However, this degrades the capability of the switching regulator circuit to provide the regulated predetermined output voltage required under conditions of line and load transients.

The phase shift induced by one or more chokes located in the output circuit of the switching regulator circuit is included in the output of the switching regulator circuit. Therefore, the feedback signals from the output to the control circuit includes the phase shift voltage induced by the chokes. In order to increase the reaction time of the control circuit for providing the required regulated output and at the same time to reduce the possibility of oscillations in the output as described above it is desirable to eliminate the phase shift from the feedback voltage or signal. The elimination of the phase shift is accomplished by the sensing of the phase shift across the choke. A sensing winding and a primary winding have approximately the same number of turns disposed about the core of the choke. The primary winding has the voltage from the switching apparatus applied therethrough to the output of the switching regulator circuit. The same phase shift voltage is generated across the secondary or sensing winding within the feedback loop as was induced into the output by the primary winding on the choke through which the voltage from the switching apparatus is applied to the output of the switching regulator circuit. In other words, the phase shift voltage across the primary windings within the output circuit is subtracted by an identical voltage generated across the secondary windings within the feedback loop. Thus, a feedback voltage or signal is produced which has the phase shift present in the output elimintated thererform. This feedback voltage is applied to the control circuit. This enables the control circuit to prevent the oscillation problems discussed above and yet rapidly respond to any fluctuation in the output voltage caused by line or load transients.

A particular choke having only one winding is described herein. The number of turns in the output circuit is equal to one and the number of turns in the feedback loop is also equal to one. A choke which has been found useful for the one winding situation has a cylindrical slug through which the current of the switched apparatus or device is applied to the output of the switching regulator circuit. Disposed about the cylindrical slug are at least one cylindrical ring, which forms the core of the choke, comprised of a magnetically conductive material. The magnetically conductive material is insulated from the slug about which it is disposed. The slug has an opening provided therein parallel to the axis of the cylinder and is concentric therewith. Disposed within this opening which can alsio be cylindrical in nature is a wire insulated from electrical contact with the slug but in magnetic communication with the core.

The wire comprises the winding of the feedback loop and has one end connected to the output of the switching regulator circuit and its other opposite end connected to the control circuit. The AC voltage drop across the slug will be induced into the wire disposed in the center opening of the slug, thereby subtracting this AC drop, which comprises the phase shift, from the output voltage for providing a feedback voltage from which the phase shift is eliminated. This choke can be utilized with any D.C. power supply.

It is therefore an advantage of the present invention to provide a control circuit which regulates a switching regulator circuit by providing a feedback voltage which eliminates the phase shift across the choke in the output circuit.

It is a further advantage of this invention to provide increased stability of the DC voltage at the output of a switching regulator circuit by providing a feedback voltage formed by subtracting the phase shift across the choke at the output from the output voltage.

Another advantage of this invention is to provide an improved switching regulator circuit with increased stability and faster reaction to changes in the DC output voltage by reducing the possibility of oscillations caused by the control circuit attempting to compensate for the AC phase shift voltage across the choke included in the output circuit of the switching regulator circuit.

It is a further advantage of the present invention to provide for the sensing of the AC phase shift voltage across the choke present in the output circuit of a switching regulator circuit.

It is another advantage of the present invention to sense the phase shift across the choke of an output circuit of a switching regulator circuit by providing the same number of turns about the choke core as provided in the circuit of the choke having the input current flowing therethru.

Still another advantage of the present invention is to provide a choke particularly adaptable to high current, low voltage environments having a cylindrical slug with a core disposed thereabout and having the winding of the feedback circuit disposed at the center of the slug passing therethru and insulated therefrom.

Another advantage of this invention is to provide a regulated power supply with improved stability and regulation under transient line and load conditions.

BRIEF DESCRIPTION OF THE DRAWINGS

FIG. 1 is a block diagram of a switching regulator circuit utilizing the present invention;

FIG. 2 is a block diagram of another embodiment of the present invention;

FIG. 3 is a schematic diagram of an output circuit utilizing a portion of the present invention;

FIG. 4 is a side view of a choke constructed according to the present invention;

FIG. 5 is an enlarged cross-sectional view taken along line 5-5 of FIG. 4; and

DESCRIPTION OF THE PREFERRED EMBODIMENT

Figure 6:
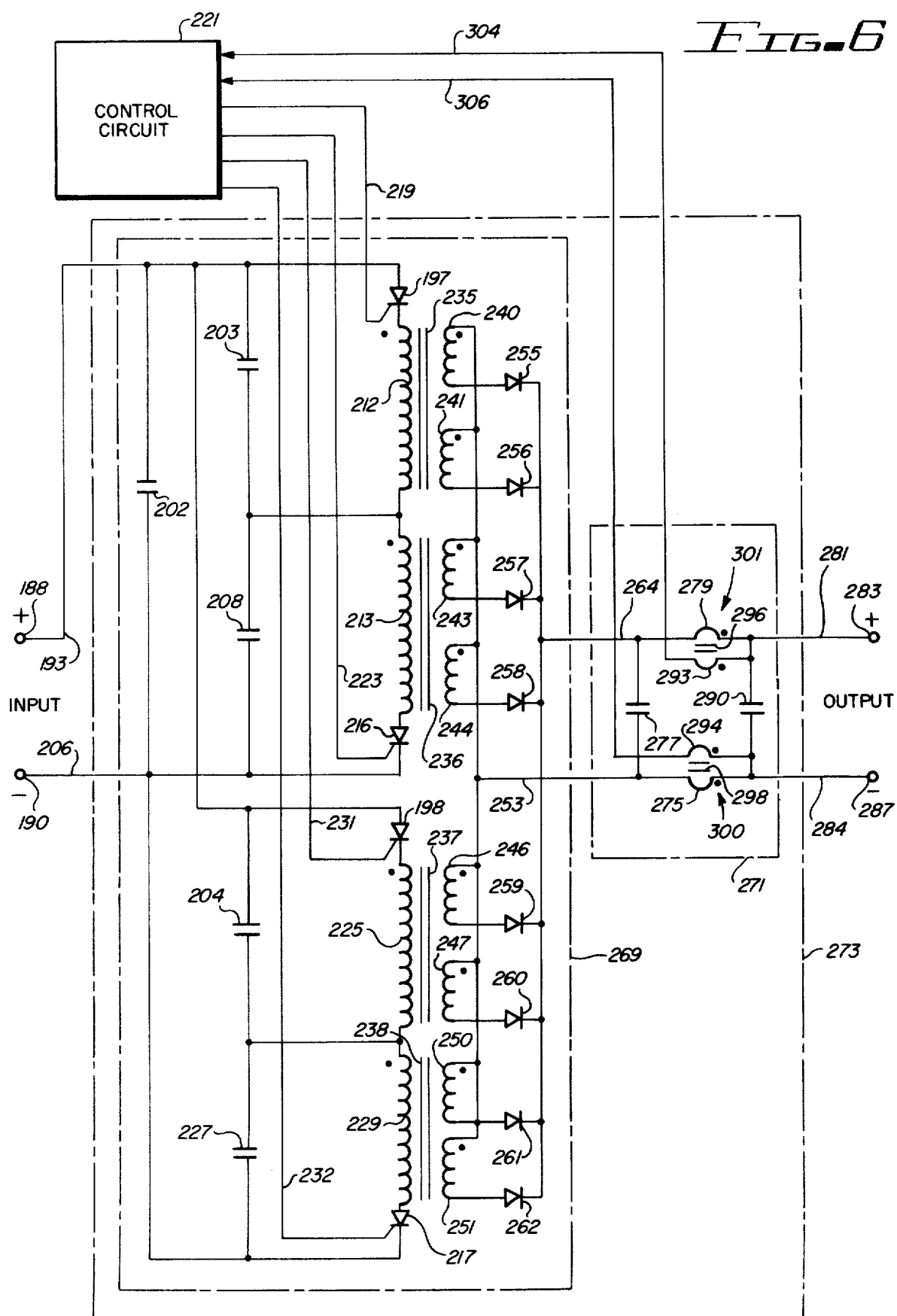
FIG. 6 is a schematic diagram of another embodiment of the present invention.

Referring more particularly to the drawings by characters of reference, FIG. 1 discloses a switching regulator circuit 10. A particular form of the switching regulator circuit is described in detail in connection with FIG. 6 herebelow. The type of switching regulator circuit utilized with the present invention is more fully described in U.S. Pat. No. 3,573,597 issued to Genuit et al on Apr. 6, 1971 and entitled "High Current Switching Regulator with Overlapped Output Current Pulses", and U.S. Pat. No. 4,142,231 issued to Wilson et al on Feb. 27, 1979 and entitled "High Current Low Voltage Liquid Cooled Switching Regulator DC Power Supply", both of which are incorporated by reference herein.

The switched regulator circuit is comprised of a switched apparatus 12 and an output circuit 14. The switching apparatus 12 is shown in detail in the Genuit and Wilson patents and further as an example one such switched apparatus is discussed in connection with FIG. 6 herebelow. The output circuit 14 which can be of several arrangements as discussed herein is shown in the Genuit patent.

Switched apparatus 12 provides as its output through line 16 a DC voltage which contains ripples therein (as shown in FIG. 5 of the Genuit patent). The rippled relatively low DC voltage which is of a high current is connected to a filter capacitor 18 and a choke 20. The other opposite end of capacitor 18 away from line 16 is connected to ground. One end of a winding 22 of choke 20 is connected to line 16. The other opposite end of winding 22 is connected through line 26 to the output terminal 28 of switching regulator circuit 10. Choke 20 has a secondary or sensing winding 30 disposed about core 24. Winding 22 and winding 30 should be of approximately the same number of turns, i.e., the AC voltage generated across winding 22 should also be present across winding 30. Winding 30 should have the same magnetic linkage with core 24 as winding 22. Winding 30 is connected through line 32 and line 26 to terminal 28. The other opposite end of winding 30 is connected through line 34 to a control circuit 36. The windings are disposed about core 24 so that a positive AC voltage at the output terminal across winding 22 results in a negative A.C. voltage of equal magnitude induced across winding 30 at line 34.

Control circuit 36 can be of the nature of any control system for a switching regulator circuit as known in the art, for example, the control circuit shown in FIG. 7 of the Genuit patent. Sensing winding 30, and lines 32 and 34 comprise a feedback loop 38. The input to loop 38 is the output voltage present on terminal 28. The output of loop 38 to control circuit 36 is the output voltage at terminal 28 minus the AC phase shift voltage generated by choke 20 within winding 22 and induced onto winding 30. The feedback loop 38 or control circuit 36 should provide sufficient impedance so that the current in the feedback loop 38 is relatively low.

Control circuit 36 utilizes the voltage or feedback signal present on line 34 to generate control signals to multiline channel 41. Each of the control signals is connected through one of the lines (not shown) of channel 41 to a gate of an SCR (not shown) located within switching apparatus 12. By changing the timing of the control signals (or pulses) to the gates of the SCRs in response to changes in the DC voltage present on terminal 28, control circuit 36 regulates the output of the switching regulator circuit 10. As is discussed herebelow the SCRs are actuated by the control signals from control circuit 36 so that they conduct to generate a voltage to line 16 and through output circuit 14 through terminal 28. The greater the time between actuation (or firing) of the SCRs the lower the voltage and current to terminal 28. Conversely, the less time between the firings of the SCRs the higher the DC voltage and current to line 28 (within the perameters of the device). A certain time interval must be provided for the SCR and its associated reactor to recover after the SCR is made conductive by the control signal. For example, if the load between terminal 28 and ground is increased more current is drawn from switched apparatus 12. The voltage at terminal 28 tends to drop. In response to the lower voltage at terminal 28, control circuit 36 decreases the time interval between control pulses to the SCR and thereby raises the voltage at terminal 28 and increases the current through line 16 to terminal 28.

Another embodiment of the present invention is shown in FIG. 2. A switching regulator circuit 45 comprised of a switched apparatus 47 and an output circuit 49 supplies a regulated DC voltage to an output terminal 51. Switched apparatus 47 is of the type similar to or identical with switched apparatus 12 of FIG. 1. Switched apparatus 47 provides a slightly rippled output voltage to line 53 which is connected to a capacitor 55 within output circuit 49. Line 53 is also connected to a choke 57. The primary winding of choke 57 is shown as resistance 56 and winding 61. Winding 61 is connected through line 63 to output terminal 51 and a capacitor 65. Choke 57 and capacitors 55 and 65 comprise the standard $\pi$ network as known in the art. The ends of capacitors 55 and 65 opposite from the ends connected to choke 57 are connected to ground. The switched apparatus 47 is also connected through line 67 to ground as is a resistor 69 through line 71. A sensing winding 73 is disposed about the same core 75 of choke 57 as winding 61. The number of turns of each of the windings 61 and 73 should be approximately equal so that the AC voltage generated across winding 61 and representing the phase shift between the output of switched apparatus 47 at line 53 and the voltage present at terminal 51 is induced across winding 73. An end of winding 73 is connected to output terminal 51 through line 80. The other opposite end of winding 73 is connected through line 84 to a control circuit 88.

Since the phase shift voltage present between the output of switched apparatus 47 and terminal 51 is subtracted from the voltage present at terminal 51, the output of winding 73 has the phase shift voltage eliminated therefrom. Lines 80 and 84, and winding 73 comprise a feedback loop 92. The phase shift induced into the output voltage by choke 57 tends to result in instability if that voltage alone is used as an input to the control circuit 88. The reaction speed of control circuit 88 to fluctuations in the voltage at terminal 51 can be decreased but this degrades the capability of reacting to line and load transients. The control circuit can merely be connected to line 53. Although this does eliminate the phase shift component of the input to control circuit 88, this reduces the ability of control circuit 88 to provide close DC regulation because the output of the switching regulator circuit 45 at terminal 51 is no longer sensed by the control circuit 88 and the voltage drop across resistance 59 is not taken into account.

The sensing winding 73 and the winding 61 should be closely coupled to ensure that the AC component induced into winding 73 is as nearly identical as possible to the phase shift across winding 61. Utilizing the arrangement of the present invention, allows the input to the control circuit 88 to be, as closely as is possible, the DC component present at terminal 51. At light loads applied between terminal 51 and ground, it has been found that it is possible for oscillations to be induced into the output at terminal 51 by control circuit 88 reacting to the phase shift voltage across winding 61. As discussed above this can be partially eliminated by reducing the reaction time of control circuit 88 to the changes in the output voltage at terminal 51. However, as discussed above this degrades the ability of control circuit 88 to react to changes in load and line characteristics. The line is the unregulated DC voltage input (not shown in FIGS. 1 and 2) to switched apparatus 12 and 47. The load is the apparatus placed across terminal 51 and ground to which switching regulator circuit 45 supplies power.

The control circuit 88 of FIG. 2 includes the resistor 69 connected to line 96 at an input to comparator 98. Line 96 is also connected to one end of a resistor 99. The other opposite end of resistor 99 is connected to line 84 and receives the DC component of the output voltage at terminal 51 from sensing winding 73. A reference voltage is applied to input terminal 103. The reference voltage on terminal 103 which is applied through line 107 to an input of comparator 98 permits the comparator to determine if the voltage present on line 96 is above or below the reference voltage. Resistors 69 and 99 and the reference voltage on terminal 103 have relative magnitudes to ensure that if the voltage on line 96 is exactly equal to the reference voltage on line 103, the output voltage on terminal 51 is the desired, predetermined output voltage.

Comparator 98 indicates through line 110 to control unit 112 whether the voltage on line 96 is above or below the reference voltage at terminal 103 and the magnitude of the difference, if any. For example, the output of comparators 98 could be positive if the voltage on line 96 is above the reference voltage at terminal 103 and the magnitude of the voltage corresponding to the magnitude of the difference between the voltages. Control unit 112 responds to the input from comparator 98 through line 110 to alter the rate at which the control signals (or pulses) are provided to the gates of the SCRs present in switching apparatus 47 through multiline channel 114. The faster the control signals are applied in a predetermined sequence to the various SCRs the higher the DC current output to line 53 with the corresponding maintenance of the output voltage at terminal 51. That is, as the load across terminal 51 and ground increases and the current required correspondingly increases, in order to prevent the voltage from dropping at terminal 51 the current output of switching apparatus 47 to line 53 is increased.

Another output circuit 119 is shown in FIG. 3. The switching apparatus for utilization with the output circuit 119 provides a positive and negative output (one of which can, of course, be ground). The positive and negative outputs of the switching apparatus are connected through lines 122 and 123, respectively, to the ends of filter capacitor 125. That is, one end of capacitor 125 is connected to line 122 and the other opposite end of capacitor 125 is connected to line 123. Line 122 is connected to one end of a winding 127 of a choke 129. The winding 127 is disposed about a core 131 of the choke 129. The other end of winding 127 away from the end connected to line 122 is connected to a positive output terminal 133 through line 135. Line 135 also connects the output terminal 133 to one end of a filter capacitor 137, and to one end of a sensing winding 139. The relationship of the windings 127 and 139 of choke 129 is similar to that of the windings comprising chokes 20 and 57 (FIGS. 1 and 2, respectively) as discussed above. The end of winding 139 away from line 135 is connected to a control circuit (not shown) through line 141. The control circuit can be that shown in FIG. 7 of the Genuit patent. Line 141 can be connected to the positive input of the control circuit.

Line 123 is connected to one end of winding 143 of a choke 145. The other opposite end of choke 143 away from line 123 is connected to a negative output terminal 147 through line 149. Line 149 also connects the output terminal 147 to the end of capacitor 137 away from line 135 and to one end of a sensing winding 151 of choke 145. Choke 145 has a core 153 about which windings 143 and 151 are disposed. Choke 129 and 145 are similar in construction. The end of winding 151 away from line 149 is connected through line 155 to the negative terminal of the control circuit. The negative terminal 147 can be at ground. The windings of the chokes 129 and 145 are disposed in the same manner as choke 57 above.

A particular choke 159 which has been found to be useful is shown in FIGS. 4 and 5. This particular choke arrangement is useful where the number of turns on a choke is equal to one. (The choke 20 in FIG. 1 is shown as having only one turn, for example). The choke 159 has a slug 161, which can be of any convenient shape. The slug 161 as shown in FIGS. 4 and 5 is cylindrical by shape. The slug is constructed of an electrically conductive material. Disposed about the slug 161 are rings 163 through 166. The rings are constructed of a molybdenum permalloy material to form the magnetic core. The rings should preferably be constructed as to conform to the shape of the slug. Therefore, since the slug is cylindrically shaped the rings are circular and are disposed concentric with the axis of the slug. As shown in FIG. 5, ring 165 has its interior surface 168 disposed adjacent to the exterior surface 170 of slug 161. The rings can be spaced along slug 161 in any convenient arrangement.

It may be useful in some instances to electrically insulate slug 161 from the rings 163 through 166 if the rings are comprised of a highly electrically conductive material.

Although four rings are shown in FIG. 4 it is only necessary that at least one ring be disposed about slug 161 to provide the necessary core. The plurality ring shown in FIG. 4 has been found useful because it allows generally a better control over the amount of inductance in the core. As shown herein each ring provides an inductance of 0.075 microhenries. The core has an industance of 0.3 microhenries. The capacitors 125 and 137 have a capacitance of 300,000 and 168,000 microfarads, respectively.

Slug 161 has a cylindrical opening disposed parallel to its axis and concentric therewith. Cylindrical opening 172, as shown in FIG. 5, has a wire (or line) 176 disposed therein. Wire 176 is covered by an insulating material 178 to prevent electrical contact between wire 176 and slug 161. Although a particular physical arrangement of a cylindrical slug with a wire disposed along its axis is shown in FIGS. 4 and 5, wire 176 can be disposed at any convenient location through slug 161. It is however necessary that the magnetic linkage formed through wire 176 to rings 163 through 166 be approximately equal to the magnetic linkage between slug 161 and the rings. In other words, wire 176 must be disposed through slug 161 in such a manner that the AC voltage induced into wire 176 is approximately equal to the AC voltage generated across slug 161. Slug 161 is adapted to carry large currents and is suitable for use as, for example, the primary winding 22 in FIG. 1. Slug 161 can easily carry high currents while wire 176, because of the high impedance of the feedback loop, need only carry relatively low currents since control circuit 36, for example, is only sensing the output voltage and not current.

Thus choke 159 can be utilized for choke 20 in FIG. 1. Slug 161 is used for winding 22. Rings 163 through 166 comprise core 24. Sensing winding 30 is comprised of wire 176. Thus, wire 176 would be connected to lines 32 and 38, and slug 161 would be connected to lines 16 and 26. One end of wire 176 is connected to terminal 28 through line 26. The wire 176 extends from line 26 through the end of slug 161 connected to terminal 28 through line 26 into cylindrical opening 172. The wire then further extends through the cylindrical opening 172 and exits slug 161 at its other opposite end connected to line 16. The other end of wire 176 away from line 26 is connected to control circuit 36 through line 34.

The switching regulator circuit shown on FIG. 6 is exemplary only and any suitable switching regulator circuit and control circuit can be utilized in the present invention. The switching regulator circuit of FIG. 1 of the Wilson patent can also be utilized with the present invention.

As shown in FIG. 6 input terminals 188 and 190 receive the positive and negative, respectively, outputs of an unregulated DC power supply of relatively high voltage on the order of 286 V. DC. The line voltage applied to terminals 188 and 190 is subject to transients. The voltage on input terminal 188 is connected through line 193 to the anodes of SCRs 197 and 198. Line 193 is also connected to capacitors 202 through 204. The other side of the capacitor 202 away from line 193 is connected through line 206 to terminal 190. The side of capacitor 203 away from line 193 is connected to another capacitor 208 and to one end of primary winding 212 and 213. The side of capacitor 208 away from the side connected to capacitor 203 is attached to line 206. Line 206 is also connected to the cathodes of SCRs 216 and 217.

The cathode of SCR 197 is connected to the end of primary winding 212 away from the end attached to capacitor 203. The gate of SCR 197 is connected through line 219 to control circuit 221. The end of primary winding 213 away from its attachment to capacitor 203 is connected to the anode of SCR 216. The gate of SCR 216 is connected through line 223 to control circuit 221.

The cathode of SCR 198 is connected to a primary winding 225. The other opposite end of primary winding 225 is connected to capacitors 207 and 227 and one end of a primary winding 229. The end of primary winding 229 away from primary winding 225 is connected to the anode of SCR 217. The gates of SCRs 198 and 217 are connected through lines 231 and 232, respectively, to control circuit 221. The end of capacitor 227 away from capacitor 204 is connected to line 206.

Primary windings 212 and 213, 225, and 229 are in magnetic contact with cores 235, 236, 237, and 238, respectively. Cores 235 through 238 are magnetically isolated from one another. Core 235 has secondary windings 240 and 241 in magnetic contact therewith. Secondary windings 243 and 244 are in magnetic contact with core 236. Core 237 is in magnetic contact with secondary windings 246 and 247. Secondary windings 250 and 251 are in magnetic contact with core 238. One end of the secondary windings 240, 241, 243, 244, 246, 247, 250 and 251 are connected to line 253. As shown in FIG. 6 the core run from the top of the page to the bottom with the primary windings being disposed on the left and the secondary windings on the right. All of the secondary winding ends closest to the top of the page are those connected to line 253. The other opposite ends of secondary windings 240, 241, 243, 244, 246, 247, 250 and 251 are connected to the anodes of diodes 255 through 262 respectively. The cathodes of diodes 255 through 262 are connected to line 264. As many additional SCRs with additional lines from control circuit 221 provided to each SCR cores, and primary and secondary windings can be added to provide the necessary current. An arrangement of 16 such units has been found to be useful. The components just described except for the input terminals and the control circuit 221 comprise switched apparatus 269. The switched apparatus 269 and the output circuit 271 comprise the switching regulator circuit 273.

Output circuit 271 receives as inputs lines 253 and 264. Line 253 is connected to primary winding 275 and a filter capacitor 277. Line 264 is connected to the side of capacitor 277 away from the side thereof connected to line 253. Line 264 is also connected to a primary winding 279. The side of winding 279 away from line 264 is connected through line 281 to positive output terminal 283.

The end of winding 275 away from line 253 is connected through line 284 to a negative output terminal 287. Filter capacitor 290 is connected between lines 281 and 284. Lines 281 and 284 are also connected to one end of sensing windings 293 and 294, respectively. Windings 279 and 293 are associated with a core 296. Windings 275 and 294 are associated with a core 298. Although windings 275, 279, 293 and 294 are shown in FIG. 6 as having one turn, these windings can comprise, in various embodiments of the invention, more than one turn. Windings 275 and 294 and core 298 comprise choke 300. A choke 301 is comprised of windings 279 and 293 and core 296. The end of winding 293 away from line 281 is connected through line 304 to an input (positive) of control circuit 221. The end of winding 294 away from line 284 is connected to an input (negative) of control circuit 221 through line 306. Chokes 300 and 301 can be similar to choke 159 shown in FIGS. 4 and 5 as described above. Terminals 283 and 287 are the positive and negative outputs, respectively, of the switching regulator circuit 273. The voltages on lines 304 and 306 are the positive and negative feedback signals, respectively, to control circuit 221.

As discussed above in connection with FIG. 3, the arrangement of output circuit 271 provides the control circuit with feedback voltages (or signals) on lines 304 and 306 from which the phase shift across windings 275 and 279 is eliminated by the AC voltage induced into windings 294 and 293, respectively. Control circuit 221 provides the control signals to lines 219, 223, 231 and 232 at a rate which is responsive to the voltages (or feedback signals) present on lines 304 and 306.

In operation, control circuit 221 provides a control signal through line 219 to the gate of SCR 197. The SCR becomes conductive and the positive voltage present at the anode from terminal 188 through line 193 causes a current flow through winding 212 and capacitor 208 to negative terminal 190. The current flow through winding 212 and capacitor 208 is initially sinusoidal at a resonant frequency and it is terminated shortly after the peak value when the resulting induced voltages in secondary windings 240 and 241 have reversed polarity and cause diodes 255 and 256 to be forward biased. The stored energy in core 235 is then discharged by currents flowing through secondary windings 240 and 241 and diodes 255 and 256 to output circuit 231. Control circuit 221 then applies a control signal through line output circuit 231 to SCR 198 which causes SCR 198 to conduct. The positive voltage on terminal 189 is applied through SCR 198 to winding 225 and through capacitor 227 to negative terminal 190. The resulting current flow through winding 225 includes a potential in secondary windings 246 and 247 which results in a current flow through diodes 259 and 260 respectively. This current flow is applied through line 264 to output circuit 271. The control circuit 221 next sends a control signal through line 223 to actuate SCR 216 followed by a control signal to SCR 217 through line 232. These SCRs conduct and cause current flow through line 264 as discussed above in connection with SCRs 197 and 198.

The shorter the time interval between control signals (or in other words the faster the rate of applying control signals through the sequence described above) the greater the current flow experienced through line 264. This increased current flow as demanded by an increased regulator load tends to maintain the voltage at terminals 283 and 287. The converse is true as the rate is reduced. Of course, the same current present in line 264 will also flow through line 253 to form a complete electrical circuit. The voltage potential between lines 264 and 253 has a ripple which is smoothed out by output circuit 271. However, in smoothing out this ripple a certain phase shift is introduced into the voltage present on terminals 283 and 287 by chokes 301 and 300, respectively. This phase shift is eliminated by windings 293 and 294 so that the feedback voltages (or signals) to control circuit 221 have the phase shift eliminated therefrm. The input to the switching regulator circuit 273 is on the order of 286 V. DC. The output of the switching regulator circuit 273 is approximately equal to 3.3 volts DC at 1200 amps. The values for the output circuit can be those set forth in the description of the output circuit 119 in FIG. 3. In certain applications it is possible that windings 293 and 294 will only reduce the amplitude of the phase shift and not eliminate it altogether. However, it is possible to substantially eliminate the phase shift voltage from the feedback signals applied through lines 304 and 306 to the control circuit 221.

Thus, by eliminating the phase shift from the control signals on lines 304 and 306 it is possible to design control circuit 221 to react very rapidly to any changes in the voltage potential between terminals 283 and 287. This higher speed does not result in oscillations which can occur in the prior art regulators because the phase shift is eliminated from the feedback voltages (or signals) applied to the control circuit. Thus, the elimination of the phase shift from the feedback voltages allows rapid regulation of the output voltage and further allows increased stability in the output voltage. The switching regulator circuit 273 must be responsive to the changes in the input or line voltage between terminals 188 and 190 and changes in the load caused by whatever particular circuits are connected across output terminals 283 and 287.

In summary, a switching regulator circuit is shown herein wherein the phase shift voltage is eliminated from the feedback loop to the control circuit for the switching regulator circuit. The output circuit of the switching regulator circuit includes at least one choke which is located in the output circuit in series with the current applied to the load across the switching regulator circuit. The choke induces phase shift into the output which can cause the control circuit for the switching regulator circuit to oscillate at light current loads. Therefore, a sensing winding is associated with each choke whereby the feedback voltage applied to the control circuit has the phase shift substantially eliminated therefrom. A sensing winding is disposed in magnetic contact with the core of the choke. The winding of the choke through which the output current is passing is, of course, also associated and is in magnetic contact with the core. The control circuit provides control signals to the SCRs of the switching regulator circuit at a rate which is in response to the feedback voltage. A particular choke arrangement is shown herein wherein one winding of the choke is comprised of a slug of conductive material. The second winding is of a wire which is insulated from the slug and passes therethru. The slug is surrounded by at least one core (which are shown in the shape of rings herein) which provide the necessary impedance for the choke. The wire comprises the sensing winding of the choke. The sensing winding is utilized to subtract the phase shift voltage across the primary winding of the choke from the output thereof and therefor to eliminate it from the feedback voltage.

Whereas the present invention has been described in particular relation to the drawings attached hereto, it should be understood that other and further modifications, apart from those shown or suggested herein, may be made within the scope and spirit of this invention.

What is claimed is:

1. An apparatus for stabilizing a switching regulator circuit having a choke located at the output thereof, comprising:
  a. sensing winding connected to the output of said switching regulator circuit in magnetic communication with said choke for subtracting the phase shift thereacross from the output of said switching regulator circuit to produce a feedback signal; and
  b. a control circuit operatively connected to receive said feedback signal and to produce control signals to said switching regulator circuit in response thereto whereby said control circuit stabilizes said switching regulator circuit and including an output terminal connected to receive the output of said switching regulator circuit and wherein said choke includes an electrically conductive slug connected in series with the output of said switching regulator circuit with one end connected to said output terminal; at least one magnetically conductive ring disposed about said slug to form a core; and a wire disposed within said slug and electrically insulated therefrom, one end of said wire being connected to said output terminal, said wire extending from said one end thereof through said slug from said one end of said slug toward another opposite end thereof.

2. An apparatus for stabilizing a switching regulator circuit having a choke located at the output thereof, comprising:
  a. a sensing winding connected to the output of said switching regulator circuit and in magnetic contact with said choke for subtracting the phase shift thereacross from the output of said switching regulator circuit to produce a feedback signal; and
  b. a control circuit operatively connected to receive said feedback signal providing control signals to said switching regulator in response thereto whereby said control circuit stabilizes said switching regulator circuit and including an output terminal connected to receive the output of said switching regulator circuit and wherein said choke includes an electrically conductive slug connected in series with the output of said switching regulator circuit with one end connected to said output terminal; at least one magnetically conductive ring disposed about said slug to form a core; and a wire disposed within said slug and electrically insulated therefrom, one end of said wire being connected to said output terminal, said wire extending from said one end thereof through said slug from said one end of said slug toward another opposite end thereof.

* * * * *